United States Patent [19]
Craig

[11] Patent Number: 5,329,703
[45] Date of Patent: Jul. 19, 1994

[54] GAGE BLOCK

[76] Inventor: William L. Craig, 1675 S. Hadley, Ortonville, Mich. 48462

[21] Appl. No.: 937,971

[22] Filed: Aug. 31, 1992

[51] Int. Cl.⁵ .............................................. G01B 3/30
[52] U.S. Cl. ......................................... 33/567; 33/502
[58] Field of Search ....................... 33/567, 567.1, 502

[56] References Cited

U.S. PATENT DOCUMENTS

| | | |
|---|---|---|
| 1,366,393 | 1/1921 | Loeffler . |
| 2,306,227 | 12/1942 | Seidel . |
| 2,446,562 | 8/1948 | Trbojevich . |
| 2,536,401 | 1/1951 | Victor ..................................... 33/567 |
| 3,345,754 | 10/1967 | Lipkins . |
| 4,389,785 | 6/1983 | Goldsmith et al. . |

Primary Examiner—William A. Cuchlinski, Jr.
Assistant Examiner—C. W. Fulton
Attorney, Agent, or Firm—Gifford, Groh, Sprinkle, Patmore and Anderson

[57] ABSTRACT

A gage block is designed as a stepped sine block to produce commonly used angles when used with a conventional sine bar without the use of conventional gage blocks. Reference surfaces parallel to one or more bases are provided to produce the desired number of commonly used angles.

12 Claims, 1 Drawing Sheet

GAGE BLOCK

BACKGROUND OF THE INVENTION

1. Field of the Invention

This invention relates to a gage block and more particularly to a gage block for use with a sine bar to set up commonly used angles.

2. Description of the Related Art

Gage blocks are used with conventional sine bars to set up specific angles to be measured or a specific angle to be machined on a work piece.

Individual gage blocks are provided with two precision machined or ground parallel surfaces with a precisely controlled thickness. In use with a sine bar, the gage blocks are stacked up on the surface plate of the sine bar to produce the desired angle between the pivotable measuring plate and the surface plate.

Sine bars are commonly available in 3", 5" and 12" sizes which denotes the distance between the sine bar pivot point and the spherical ball which rests on the top surface of the stack of gage blocks. Since this distance is the hypotenuse of a right triangle with the combined height of the stacked gage blocks forming the side opposite the angle being set, the total height of the gage blocks must be equal to the product of the sine bar size and the sine of the angle being set. Thus for a 5" sine bar, the combined height of the stacked gage blocks for a 10° angle must be 5 sine 10° or 5×0.17365=0.8682".

Gage blocks are supplied in sets of over 80 blocks to provide desired angles up to 45°, as is well known in the art. A minimum of two to four blocks are usually necessary to set a desired angle. Using a 5" sine bar to set up common 5° angle increments, a 5° angle can be set using three gage blocks with thicknesses of 0.1008", 0.1350" and 0.2000". A minimum number of blocks for 15° would be four blocks having thicknesses of 0.1001", 0.1440", 0.0500" and 1.0000, and a minimum number of blocks for 45° would be four blocks having thicknesses of 0.1005", 0.1350", 0.3000" and 3.0000. Sixteen blocks would be required in different combinations to set up the common angles of 5°, 10°, 15°, 20°, 30° and 45°.

Moreover, the user must have a sine table and must multiply the sine of the angle required by 5 to select the proper combination for the angle. For example, for 15°, the sine is 0.25882" requiring a total height of blocks of 1.2941". Mistakes in the selection of the blocks to provide a given total height can be easily made so that extreme care must be used in setting individual angles While there have been innovations in sine bar constructions throughout the years, primarily to allow incremental angle settings by the use a vernier scale or the like, such as those shown in U.S. Pat. Nos. 1,366,396 and 4,389,785, they still require the selection of individual gage block combinations to produce the individual desired angle.

SUMMARY OF THE INVENTION

The gage block of the present invention is constructed as a stepped sine block to provide a set up for commonly used five degree increment angles without the use of individual gage blocks. In a preferred form of the invention the gage block is provided with a planar base and a plurality of planar reference surfaces parallel to the base at different distances from the base to establish different reference angles for each of the surfaces when the block is used with a sine bar. The planar base is placed on the surface plate surface with the spherical ball of the measuring surface engaging the selected planar reference surface for the desired angle. In another preferred form of the invention, the gage block of this invention has two planar base surfaces normal or 90° to each other to provide the desired planar reference surfaces.

In the illustrated embodiment, one base has parallel reference surfaces spaced from the base to provide angles of 5°, 10°, 15° and 20°. A second base at 90° from the first base provides reference surfaces for producing a 30° and 45° angle. The planar reference surfaces are joined to each other and to the base by planar connecting surfaces which are normal to the reference surfaces. In the embodiment having two planar bases, the planar connecting surfaces for one base serve as the reference surfaces for the second base. In this manner, the step sine block is produced with an optimum compact configuration.

The distance between a base surface and the reference surface is selected for the size of sine bar with which it will be used.

BRIEF DESCRIPTION OF THE DRAWING

The advantages of the present invention will be more apparent from the following detailed description when considered in connection with the accompanying drawing wherein.

DETAILED DESCRIPTION OF THE PRESENTLY PREFERRED EMBODIMENTS

The gage block 8 of the present invention has been carefully designed as a step sine block to present six commonly used angles: 5°, 10°, 15°, 20°, 30° and 45°, when used with a conventional sine bar taking into account the many requirements for clearance between the sine bar surface plate and measuring plate as the gage block is oriented between the surface plate and the spherical ball of the measuring plate.

Figures 1, 2:
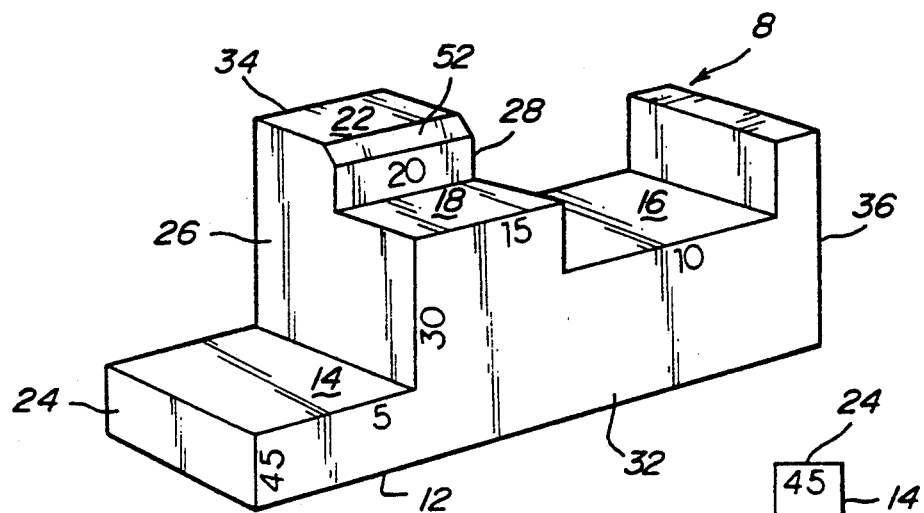
FIG. 1 in a perspective view of the stepped sine block gage of the invention showing the gage with one of its bases oriented to present 5°, 10°, 15° and 20° reference surfaces.
FIG. 2 is an elevational view of the gage block showing a second base oriented to present a 30° and 45° reference surface.

Starting with a bar of high carbon steel, or tool steel which can appropriately be hardened, the various surfaces are precision machined and ground to produce accurate parallelism between planar base 12 and its associated reference surfaces 14, 16, 18 and 22 which are the reference surfaces for the angles 5°, 10°, 15° and 20° respectively. I have respectively placed numerals adjacent to these surfaces indicating the angles that the respective surfaces will produce. The various reference surfaces are connected directly or indirectly through intervening reference surfaces to the base 12 by connecting surfaces 24, 26, 28, 32 and 34 which are normal to the reference surfaces and planar base 12. All of the reference surfaces 14, 16, 18 and 22 are within the projected area of base 12. In order to optimize the space and material requirements while providing maximum user convenience, a second planar base surface 36 is provided normal to base surface 12. Referring to FIG. 2, I have provided an extension 38 to the base 36 to provide maximum stability in use with only a small portion of the block defining reference surface 32 overhanging base 36. The connecting surfaces 24 and 26 to base 12 become the reference surfaces for 45° and 30° respectively being parallel to base 36.

Preferably, the surface of the finished gage block will have a hardness of $R_c=58-62$ and the angle tolerance will be equal or less than ±30 seconds.

Figure 3:
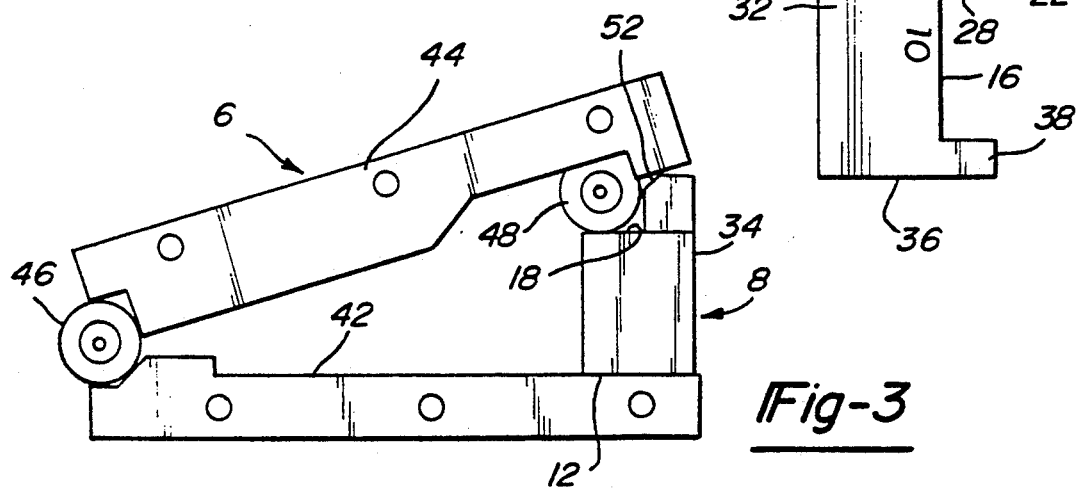
FIG. 3 shows the gage positioned in a sine bar with the first base of the gage engaging the surface plate of the sine bar and the spherical ball engaging a 15° planar reference surface.
Figure 4:
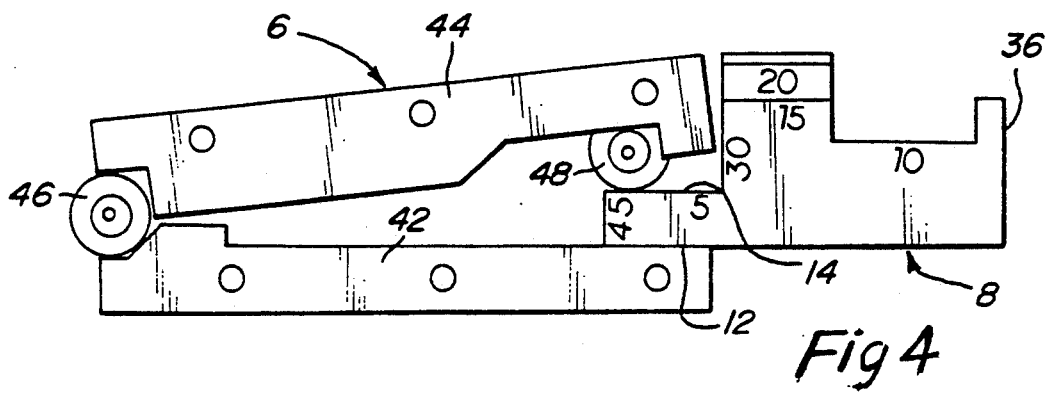
FIG. 4 is a view similar to FIG. 3 showing the gage of the invention oriented to present a 5° reference angle.

FIGS. 3 and 4 illustrate how my stepped sine gage block is used with a conventional sine bar 6, shown schematically with its essential elements: surface plate 42, measuring plate 44, pivot axis 46 and spherical ball element 48.

In FIG. 3, the sine bar 8 has been placed with its base 12 on surface plate 42 and the ball 48 on reference surface 18 to obtain a reference angle of 15°. Note that a chamfer surface 52 has been provided, as best seen in FIG. 1, to allow appropriate clearance between gage block 8 and the elements of sine bar 6.

In FIG. 4, the gage block has been again placed with base 12 on surface plate 42 in a position to engage ball 48 with reference surface 14 to produce an angle of 5°.

It will be readily apparent how my gage block 8 will be oriented relative to the sine bar 6 to produce the balance of the available angles. In producing a 30° or 45° angle, the base 36 will rest on surface plate 42 with the ball 48 engaging reference surfaces 24 or 26.

It will be also readily apparent that many modifications can be made to my stepped sine block without departing from the spirit of my invention as defined by my claims. For example, more or less than the six reference angles may be produced with a gage block having a single base or more than two bases. The stepped sine block of the invention provides a simple way of setting commonly used angles without resorting to computation or the use of an expensive gage block set which can otherwise be more advantageously used.

The embodiments of the invention in which an exclusive property or privilege is claimed are defined as follows:

1. A combination gage block and sine bar for setting up a plurality of commonly used angles comprising:
   said gage block having a planar base and a plurality of planar reference surfaces parallel to said base at different distances from said base; and
   said sine bar having a measuring surface for engaging a respective one of said planar reference surfaces to establish a different reference angle for different ones of said reference surfaces;
   wherein at least one of said reference surfaces extends beyond a projected area of said base.

2. The gage block according to claim 1 wherein said planar reference surfaces are joined to each other and to said base by planar connecting surfaces normal to said reference surfaces.

3. A gage block according to claim 2 wherein a sine bar clearance chamfer is interposed between one of said reference surfaces and one of said connecting surfaces, 4. The gage block according to claim 1 wherein the distances between said base and two of said reference surfaces produce reference angles of 5° and 10°.

5. The gage block according to claim 1 wherein the distances between said base and two of said reference surfaces produce reference angles of 15° and 20°.

6. The gage block according to claim 1 wherein the distances between said base and two of said reference surfaces produce reference angles of 30° and 45°.

7. The gage block according to claim 1 wherein said reference surfaces other than said at least one reference surface are within a projected area of said base.

8. The gage block according to claim 1 further comprising a second planar base normal to said original planar base, each base having a plurality of planar reference surfaces parallel to each base.

9. The gage block according to claim 8 wherein said planar reference surfaces of both said original planar base and said second planar base are joined to their respective planar bases and to each other base by planar connecting surfaces normal to said reference surfaces.

10. The gage block according to claim 9 wherein some of said surfaces.

11. A gage block for use with a sine bar to set up a plurality of commonly used angles comprising:
   a first planar base;
   a first plurality of planar reference surfaces parallel to said first base at different distances from said first base to establish a different reference angle for different ones of said reference surfaces when used with said sine bar;
   a second planar base normal to said first planar base;
   a second plurality of planar reference surfaces parallel to said second base at different distances from said second base to establish a different reference angle for different ones of said reference surfaces when used with said sine bar; and
   connecting surfaces for joining said reference surfaces of said first and second planar base both to their respective parallel planar bases and to other said parallel reference surfaces, some of said connecting surfaces which join parallel reference surfaces of a said planar base also serve as reference surfaces when said gage block is placed on the other said planar base.

12. The gage block according to claim 11 wherein the distances between said first base and four of said reference surfaces produce reference angles of 5°, 10°, 15° and 20°, and the distances between said second base and two of said reference surfaces produce reference angles of 30° and 45°.

* * * * *

UNITED STATES PATENT AND TRADEMARK OFFICE
CERTIFICATE OF CORRECTION

PATENT NO.  : 5,329,703
DATED       : July 19, 1994
INVENTOR(S) : William L. Craig It is certified that error appears in the above-indentified patent and that said Letters Patent is hereby corrected as shown below:

Column 1, line 38, after "1.0000", insert --"--.

Column 1, line 40, after "3.0000", insert --"--.

Column 4, Claim 10, Line 2, after "said", delete --surfaces" and insert --planar reference surfaces also serve as planar connecting surfaces--.

Signed and Sealed this

Eleventh Day of April, 1995

Attest:

BRUCE LEHMAN

*Attesting Officer*    *Commissioner of Patents and Trademarks*